United States Patent
Coates et al.

(10) Patent No.: US 10,324,210 B2
(45) Date of Patent: Jun. 18, 2019

(54) METHOD AND APPARATUS FOR DETERMINING ROUGH SEA TOPOGRAPHY DURING A SEISMIC SURVEY

(71) Applicant: SCHLUMBERGER TECHNOLOGY CORPORATION, Sugar Land, TX (US)

(72) Inventors: Richard Coates, Houston, TX (US); Craig Beasley, Houston, TX (US); Hannah Flath, Houston, TX (US); Clara Castellanos Lopez, Gatwick (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 212 days.

(21) Appl. No.: 15/199,272

(22) Filed: Jun. 30, 2016

(65) Prior Publication Data
US 2018/0003842 A1     Jan. 4, 2018

(51) Int. Cl.
*G01V 1/36*     (2006.01)
*G01V 1/38*     (2006.01)

(52) U.S. Cl.
CPC .............. *G01V 1/364* (2013.01); *G01V 1/38* (2013.01); *G01V 2210/532* (2013.01); *G01V 2210/56* (2013.01)

(58) Field of Classification Search
CPC .... G01V 1/364; G01V 1/38; G01V 2210/532; G01V 2210/56
USPC .......................................................... 367/24
See application file for complete search history.

(56) References Cited

U.S. PATENT DOCUMENTS

| 4,353,121 A | 10/1982 | Ray et al. |
| 4,992,992 A | 2/1991 | Dragoset, Jr. |
| 5,208,785 A * | 5/1993 | Brumley ............... G01S 15/582 367/90 |
| 5,243,541 A * | 9/1993 | Ulich ..................... G01S 7/487 348/31 |
| 5,357,892 A | 10/1994 | Vatne et al. |

(Continued)

FOREIGN PATENT DOCUMENTS

| WO | 2011028637 A2 | 3/2011 |
| WO | WO-2015082421 A1 * | 6/2015 ............... G01V 1/28 |

OTHER PUBLICATIONS

C. J. Beasley, R. Coates, Y, Ji, and J. Perdomo. Wave equation receiver deghosting: a provocative example. In 2013 SEG Annual Meeting. Society of Exploration Geophysicists, 2013—(5 pages).

(Continued)

*Primary Examiner* — Daniel L Murphy
(74) *Attorney, Agent, or Firm* — Kevin B. McGoff (57) ABSTRACT

A method comprising for deghosting seismic data is disclosed. The method includes the steps of acquiring seismic data by conducting a survey of a subsurface area of interest wherein the seismic data includes ghost data and estimating a time-varying wave height above the subsurface area of interest during at least a portion of the survey, wherein the estimation of the wave height is based at least in part on a remote measurement of the wave height during the survey. The estimated time-varying wave height is used to characterize the ghost data and deghost the seismic data based at least in part on the characterized ghost data.

19 Claims, 5 Drawing Sheets

(56) References Cited

U.S. PATENT DOCUMENTS

| | | | |
|---|---|---|---|
| 6,052,334 A * | 4/2000 | Brumley | G01C 13/002 367/90 |
| 6,529,445 B1 * | 3/2003 | Laws | G01V 1/364 367/151 |
| 6,681,887 B1 | 1/2004 | Kragh et al. | |
| 6,932,017 B1 | 8/2005 | Hillesund et al. | |
| RE41,656 E * | 9/2010 | Robertsson | G01V 1/364 367/24 |
| 9,354,341 B2 | 5/2016 | Beasley et al. | |
| 2009/0073804 A1 * | 3/2009 | Laws | G01V 1/3808 367/21 |
| 2012/0147700 A1 * | 6/2012 | Frivik | G01V 1/3835 367/19 |
| 2014/0140172 A1 | 5/2014 | Beasley et al. | |

OTHER PUBLICATIONS

D. M. Chapman. An improved kirchhoff formula for reflection loss at a rough ocean surface at low grazing angles. The Journal of the Acoustical Society of America, 73(2): Feb. 1983—pp. 520-527.

S. Grion, A. Azmi, J. Pollatos, N. Riddalls, R. G. Williams, et al. Broadband processing with calm and rough seas: observations from a north sea survey. In 83rd Annual SEG Meeting, pp. 226-230,2013.

S. Grion, R. Telling, and J. Barnes. Adaptive de-ghosting by kurtosis maximisation. In 77th EAGE Conference and Exhibition 11—May 13, 2015—Kuala Lumpur, Malaysia—(5 pages).

D. Komatitsch and J. Tromp. Introduction to the spectral element method for three-dimensional seismic wave propagation. Geophysical journal international, 139(3):806-822, 1999.

E. Kragh and R. Laws. Rough seas and statistical deconvolution, Geophysical Prospecting, 54, (4), 475-485, Jul. 2006.

R. Laws. Sea surface shape and its low frequency scattering response derived from its high frequency scattering response, ofsr/rn/2009/066/geophysics/c.Technical report, Schlumberger Gould Research, 2009.—(33 pages).

R. Laws and E. Kragh. Rough seas and time-lapse seismic. Geophysical Prospecting, 50(2):195-208, 2002.

B. Lombard, J. Piraux, C. G'elis, and J. Virieux. Free and smooth boundaries in 2-d finite-difference schemes for transient elastic waves. Geophysical Journal International, 172(1):252-261, 2008.

D. F. McCammon and S. T. McDaniel. Application of a new theoretical treatment to an aid problem; sinusoidal pressure release boundary scattering. The Journal of the Acoustical Society of America, 78(1), Jul. 1985—(8 pages).

O. Orji, W. Sollner, and L. J. Gelius. Imaging the sea surface using a dual-sensor towed streamer. Geophysics, 75(6):V111-V118, Nov.-Dec. 2010.

O. C. Orji, W. Sollner, and L.-J. Gelius. Effects of time-varying sea surface in marine seismic data. Geophysics, 77(3):p. 33-p. 43, May-Jun. 2012.

O. C. Orji, W. Sollner, and L. J. Gelius. Sea surface reflection coefficient estimation. In SEG Conference & Exhibition, 2013—(5 pages).

W. J. Pierson Jr and L. Moskowitz. A proposed spectral form for fully developed wind seas based on the similarity theory of S.A. Kitaigorodskii. Technical report, DTIC Document, 1963 (30 pages).

J. Rickett, D. van Manen, P. Loganathan, and N. Seymour. Slanted-streamer data-adaptive deghosting with local plane waves. In 76th EAGE Conference and Exhibition 2014, Amsterdam RAI, The Netherlands, Jun. 16-19, 2014—(5 pages).

J. O. Robertsson, R. Laws, C. Chapman, J.-P. Vilotte, and E. Delavaud. Modelling of scattering of seismic waves from a corrugated rough sea surface:a comparison of three methods. Geophysical Journal International, 167(1): 70-76, 2006.

E. I. Thorsos. The validity of the kirchhoff approximation for rough surface scattering using a gaussian roughness spectrum. The Journal of the Acoustical Society of America, 83(1):78-92, Jan. 1988.

P. Wang, S. Ray, C. Peng, Y. Li, and G. Poole. Premigration deghosting for marine streamer data using a bootstrap approach in tau-p domain: Presented at the 75th annual international conference and exhibition. EAGE, London, UK, Jun. 10-13, 2013—(5 pages).

Craig J. Beasley*, Richard Coates, Pearl Flath and Clara Castellanos, 2015. Slanted Cable Marine Acquisition and Wave Equation Receiver Deghosting; 77th EAGE Conference & Exhibition (Madrid), Ext. Abstract—(5 pages).

Beasley, C., Coates, R., and Ying, J., 2013a. Wave Equation Receiver Deghosting. 75th EAGE Conference & Exhibition, Ext. Abstract, Th 08 12, London, UK, Jun. 10-13, 2013, (5 pages).

Coates, R., Beasley, C.J. and Flath, P., 2015, Wave-equation receiver deghosting: real data and receiver depth estimation. 77th EAGE Conference & Exhibition, Madrid, Spain, Jun. 1-4, 2015 (5 pages).

Ferber, R. and Beasley, C.J., 2014, Simulating Ultra-deep-tow Marine Cable for Receiver Deghosting. 76th EAGE Conference & Exhibition, Ext. Abstract, Th ELI 14.

Robertsson, J.O.A., Amundsen, L. and Pedersen, Ø., 2014. Deghosting of arbitrarily depth-varying marine hydrophone streamer data by time-space domain modelling. 84th SEG Annual International Meeting, Expanded Abstracts, pp. 4246-4252.

Soubaras, R., 2010, Deghosting by joint deconvolution of a migration and a mirror migration: 80th SEG Annual International Meeting, Expanded Abstracts, pp. 3406-3410.

Fred J. Barr arid Joe I. Sanders. Attenuation of Water-Column Reverberation Using Pressure and Velocity Detectors in a Water-Bottom Cable, 59th SEG Annual international Meeting. 1989, pp. 653-653.

Johan O. A. Robertsson, Ian Morre, Massimiliano Vassallo, Kemal Ozdemir, Dirk-Jan van Marren and Ali Ozbek. On the Use of Multicomponent Streamer Recordings for Reconstruction of Pressure Wavefields in the Crossline Direction, Geophysics, vol. 73, No. 5, Sep.-Oct. 2008, p. A45-A49.

R. Ferber, P. Caprioli & L. West, L1 Pseudo-Vz Estimation and Deghosting of Single-Component Marine Towed-Streamer Data, 74th EAGE Conference & Exhibition, Copenhagen, Denmark, Jun. 4-7, 2012.

Johan O.A. Robertsson and Ed Kragh, Rough-Sea Deghosting Using a Single Streamer and a Pressure Gradient Approximation, Geophysics, vol. 67, No. 6, Nov.-Dec. 2002, p. 2005-2011.

S.Lehner & F.J. Ocampo-Torres—The SAR Measurement of Ocean Waves: Wave Session Whitepaper. Researchgate, Jan. 2004, (13 pages).

Mikhail B. Kanevsk—Radar Imaging of the Ocean Waves, Institute of Applied Physics, 2008 (pp. 99-169).

* cited by examiner

METHOD AND APPARATUS FOR DETERMINING ROUGH SEA TOPOGRAPHY DURING A SEISMIC SURVEY

BACKGROUND

Seismic data is acquired to remotely sense subsurface geologic conditions, particularly in connection with the exploration for and production of hydrocarbons, such as oil and natural gas. To gather seismic data in a marine environment, acoustic sources, such as airguns, are used to produce an acoustic signal that is transmitted through the seawater and into the subsurface geologic formations. Changes in acoustic impedance at the sea bottom and between different geologic layers cause a portion of the acoustic energy to be reflected and returned toward the sea surface. These reflected signals are received by acoustic sensors (or seismic receivers) and are processed to create images of the subsurface geology.

Survey data can be collected and processed to produce a representation (e.g., image) of a subsurface structure. In some implementations, survey data includes seismic survey data collected using seismic survey equipment. The seismic survey equipment includes one or more seismic sources that are activated to produce seismic wavefields propagated into the subsurface structure. A part of the seismic wavefields is reflected from the subsurface structure and detected by seismic receivers that are part of the survey equipment.

An issue associated with marine seismic surveying is the presence of undesirable ghost data. Ghost data refer to data in measurement data resulting from reflections from an air-water interface of the marine environment. A seismic wavefield generated by a seismic source is propagated generally downwardly into the subsurface structure. A reflected seismic wavefield (that is in response to the seismic wavefield propagated by the seismic source) propagates generally upwardly toward an arrangement of seismic receivers. In the marine environment, where receivers are generally positioned beneath the water surface, the seismic wavefield reflected from the subsurface structure continues to propagate upward past the receivers towards the air-water interface, where the seismic wavefield is reflected back downwardly.

This reflected, generally downwardly traveling seismic wavefield from the air-water interface is detected by the seismic receivers as ghost data, which appears in measurement data collected by the seismic receivers. The presence of ghost data can result in reduced accuracy when generating a representation of the subsurface structure based on the measurement data.

SUMMARY

In one embodiment, a method for deghosting seismic data is disclosed. The method includes the steps of acquiring seismic data by conducting a survey of a subsurface area of interest wherein the seismic data includes ghost data and estimating a time-varying wave height above the subsurface area of interest during at least a portion of the survey, wherein the estimation of the wave height is based at least in part on a remote measurement of the wave height during the survey. The estimated time-varying wave height is used to characterize the ghost data and deghost the seismic data based at least in part on the characterized ghost data.

In another embodiment, a method for deghosting seismic data is disclosed. The method includes the steps of acquiring seismic data by conducting a survey of a subsurface area of interest wherein the seismic data includes ghost data and remotely measuring a wave height above at least a portion of the subsurface area of interest during a portion of the survey. The measured wave height is used to characterize the ghost data. The method further includes deghosting the acquired seismic data based at least in part on the characterized ghost data.

In yet another embodiment, a system including a processor and a non-transitory memory comprising program instructions is disclosed. The program instructions are executable by the processor to acquire seismic data by conducting a survey of a subsurface area of interest wherein the seismic data includes ghost data. The program instructions further cause the processor to remotely estimate a wave height above the subsurface area of interest at pre-determined time intervals during the survey, wherein the estimation of the wave height is based at least in part on a remote measurement of the wave height. The ghost data is characterized based at least in part on the estimated wave height. Finally, a deghosting operation is performed on the acquired survey data based at least in part on the characterized ghost data.

Further, another embodiment discloses a method for acquiring seismic data by conducting a survey of a subsurface area of interest wherein the seismic data includes ghost data. The method includes the steps of remotely measuring wave height while acquiring the seismic data and deghosting the seismic data based at least in part on the measured wave height.

BRIEF DESCRIPTION OF THE DRAWINGS

Implementations of various techniques will hereafter be described with reference to the accompanying drawings. It should be understood, however, that the accompanying drawings illustrate the various implementations described herein and are not meant to limit the scope of various techniques described herein.

DETAILED DESCRIPTION

In the ensuing discussion, reference is made to performing deghosting according to some implementations in a marine survey environment to characterize a subsurface structure, techniques or mechanisms according to some implementations can also be applied to perform surveys of other structures, such as human tissue, a mechanical structure, and so forth. In addition, the following describes seismic sources and seismic receivers that are part of seismic survey equipment. In other implementations, other types of survey equipment can be used, which can include other types of survey sources and survey receivers.

The present disclosure relates to a method of analysing seismic signals and in particular to a method of analysing seismic signals adapted for use in connection with marine seismic data acquisition activities that provides for improved determination of local wave heights and acoustic sensor depths and allows "noise" in seismic data associated with changes in local wave heights and seismic sensor depths to be reduced during subsequent data processing.

In a marine environment, these acoustic sensors (also called seismic sensors, often pressure sensors known as hydrophones) are typically contained within long tube-shaped streamers and are towed behind a seismic survey vessel. The streamers are often filled with kerosene or other buoyant materials that allow the sections of the streamers to achieve approximately neutral buoyancy. The streamers often have one or more internal stress members (such as steel cables) that provide substantial tensile strength and inhibit stretching of the streamer sections, while simultaneously allowing the streamer to be relatively flexible and able to be wound around a drum of a reasonable diameter on the seismic survey vessel. The depth (or "elevation") a streamer is towed at is typically regulated by a deflector located at the end of the streamer nearest the seismic survey vessel as disclosed in U.S. Pat. No. 5,357,892 and by control devices called birds that are typically placed at regular intervals along the streamer's length as disclosed in U.S. Pat. No. 6,932,017 both of which are commonly owned and hereby incorporated by reference in their entirety.

The depths of the hydrophones in the streamer are typically monitored on the seismic survey vessel by depth sensors attached to the birds. Because the birds are widely spaced along the streamer (such as every 300 meters), compared to the significantly closer hydrophone spacing (such as a group of hydrophones every 12.5 meters), the depth of a particular acoustic sensor or a group of acoustic sensors is typically approximated by interpolating from the depth values of the birds on either side of the sensor or sensor group.

This type of relatively crude depth determination system sometimes makes it difficult for a seismic survey vessel crew to determine when certain types of problems are occurring within the streamers. For instance, streamer sections are typically "balanced" until they are approximately neutrally buoyant. Due to temperature changes on the seismic survey vessel and in the sea water, balancing problems (excessive positive or negative buoyancy) sometimes occur. If the depth of each of the hydrophone in each section could be monitored, however, it may be possible to determine which sections are experiencing balancing problems and to correct these problems before they impact the quality of the seismic data acquired or cause towing problems.

Depth sensors on the birds typically sense the local ambient water pressure and convert this pressure reading into a depth value. The water pressure measured at the bird, however, incorporates two types of transient conditions that are constantly changing as the streamer is towed. The first transient condition is the local wave height, the local sea level immediately above the sensor minus the mean sea level. Changes in the local wave height are also referred to as waves. The second transient condition is the actual streamer elevation (or depth) measured with respect to mean sea level. Changes in the actual streamer elevation are typically due to forces such as positive or negative buoyancy in the streamer sections, wave-induced forces, currents, the deflector, the birds, etc. The water pressure at the bird is influenced by both of these transient conditions. To eliminate wave effects, the measured water pressure values are typically averaged or filtered over an extended period of time (such as between 10 and 100 seconds). While this averaging or filtering produces more accurate "average" depth values for the birds, it eliminates any possibility of using the measured depth values to compensate for transient conditions having a cycle period less than half the averaging period or filter length, such as waves.

Two types of "noise" are introduced into the data by the fluctuations in the streamer depth and the local wave height. A first type of noise is caused by ghost effects. Acoustic reflections from the sea surface above an acoustic sensor or an acoustic source will cause cancellation of the received acoustic signals at frequencies that are related to the depth of the sensor or source (i.e. the "ghost" effect). Ghosts are notches in the frequency spectrum that occur at frequencies $F=n/T_g$, where n is an integer (0, 1, 2, . . . ) and the ghost period $T_g$ is equal to twice the receiver (or source) depth H (distance to the sea surface) divided by the seawater acoustic transmission velocity. The depth H (and therefore the ghost notch frequency F) needs to be corrected for the angle of incidence (as will be discussed in more detail below). There are two ghosts, one introduced on the source side and one introduced on the receiver side. Variations in the ghost notch frequency occur when the depth of the receiver or source varies. These variations can be due to a change in the absolute elevation of the streamer or the source or due to changes in the wave height above the streamer or the source.

To compensate for this ghost effect, seismic sensors are typically towed at a depth where the first non-zero ghost notch frequency is outside the seismic spectrum (between approximately 5 Hz and approximately 80 Hz) where the vast majority of information regarding the geologic subsurface of interest is obtained during a seismic survey.

In another instance, a reflected seismic wavefield (that is in response to the seismic wavefield propagated by the seismic source) propagates generally upwardly toward an arrangement of seismic receivers. In the marine environment, where receivers are generally positioned beneath the water surface, the seismic wavefield reflected from the subsurface structure continues to propagate upward past the receivers towards the air-water interface, where the seismic wavefield is reflected back downwardly.

This reflected, generally downwardly traveling seismic wavefield from the air-water interface is detected by the seismic receivers as ghost data, which appears in measurement data collected by the seismic receivers.

A deconvolution procedure can be used to compensate for the frequency-dependent attenuation of the received seismic signals caused by the ghost effect (i.e. "deghosting" the data). In conventional seismic data processing procedures, however, this deconvolution procedure will assume that the seismic sensors are placed a constant distance beneath the sea surface. Any deviation in the position of the sensor from this assumed position will cause the deghosting procedure to operate to some degree improperly; certain frequencies will be over amplified and certain frequencies will remain under amplified. In that the depth values are averaged or otherwise filtered over an extended period of time to remove wave effects on the depth values, the depth values provided by conventional seismic data acquisition equipment cannot be used to provide customised or individualised deghosting of the seismic data to account for the actual (and changing) depth values of the sensors when they were receiving the seismic data of interest.

A second type of noise is due to changes in the absolute elevation of the streamer which causes unintended shifts in the arrival times of the acoustic signals received from the underlying seismic reflectors. As the vast majority of seismic data analysis involves combining together numerous seismic traces imaging the same subsurface position, these time shifts will cause a blurring of the seismic image of the reflectors.

While these two types of deviations do not introduce "noise" in its conventional sense (i.e. unwanted signals that interfere with or mask the desired signals), it will be readily understood that they inhibit proper seismic imaging of the subsurface and therefore constitute noise in its more general sense. For some types of seismic imaging, such as analysing time-lapsed images of producing hydrocarbon reservoirs, these effects may be sufficient to mask any change in the seismic response that could be expected to result from the withdrawal of reservoir fluids. A study conducted on behalf of the Applicant has concluded that if conventional seismic data processing schemes are utilised, rough sea effects from only a 2 meter significant wave height (SWH) sea can mask any changes in seismic response that could be expected to be associated with hydrocarbon production, at least for certain reservoir types.

In conventional marine seismic surveying, the attempts made to compensate for changes in local sea height typically involve compensating for changes in mean sea level due to tidal effects. Generally, no attempt is made to correct the seismic data for wave effects or short cycle-time variations in the streamer depth values. While it is well known that the quality of seismic data will be seriously degraded if the seismic data is acquired during rough sea periods, no attempt is normally made to compensate for these type of transient conditions. When a seismic survey vessel crew or their client's onboard observer decides that the sea conditions are too rough or fail to meet the agreed upon contractual specifications, acquisition of seismic data by the seismic survey vessel is simply stopped. The client is simply forced to live with the fact that seismic data acquired during rougher sea conditions is noisier (i.e. of lower quality) than seismic data acquired during calmer sea conditions.

Seismic data acquisition contractors have a significant incentive to acquire seismic data under "questionable" weather conditions because they are not typically compensated for downtime resulting from bad weather and the amount of time spent down for bad weather can easily range between 10% and 50% of the entire mobilisation period. Some seismic data acquisition contractors are particularly aggressive about continuing seismic data acquisition activities in bad weather. This is particularly true when the seismic survey vessel is acquiring multi-client data. Multi-client data is typically acquired "on-spec" with the seismic contractor paying for the cost of the acquisition activities and then attempting to recoup these costs and make a profit by licensing access to the acquired seismic data. Some contractors apparently believe that the effects of bad weather can be removed (or at least masked) during subsequent data processing or that the clients may not realize how noisy the data actually is. This situation has been further complicated in the past because clients have lacked a method for independently determining what the sea state was when the seismic data was acquired.

Figure 1:
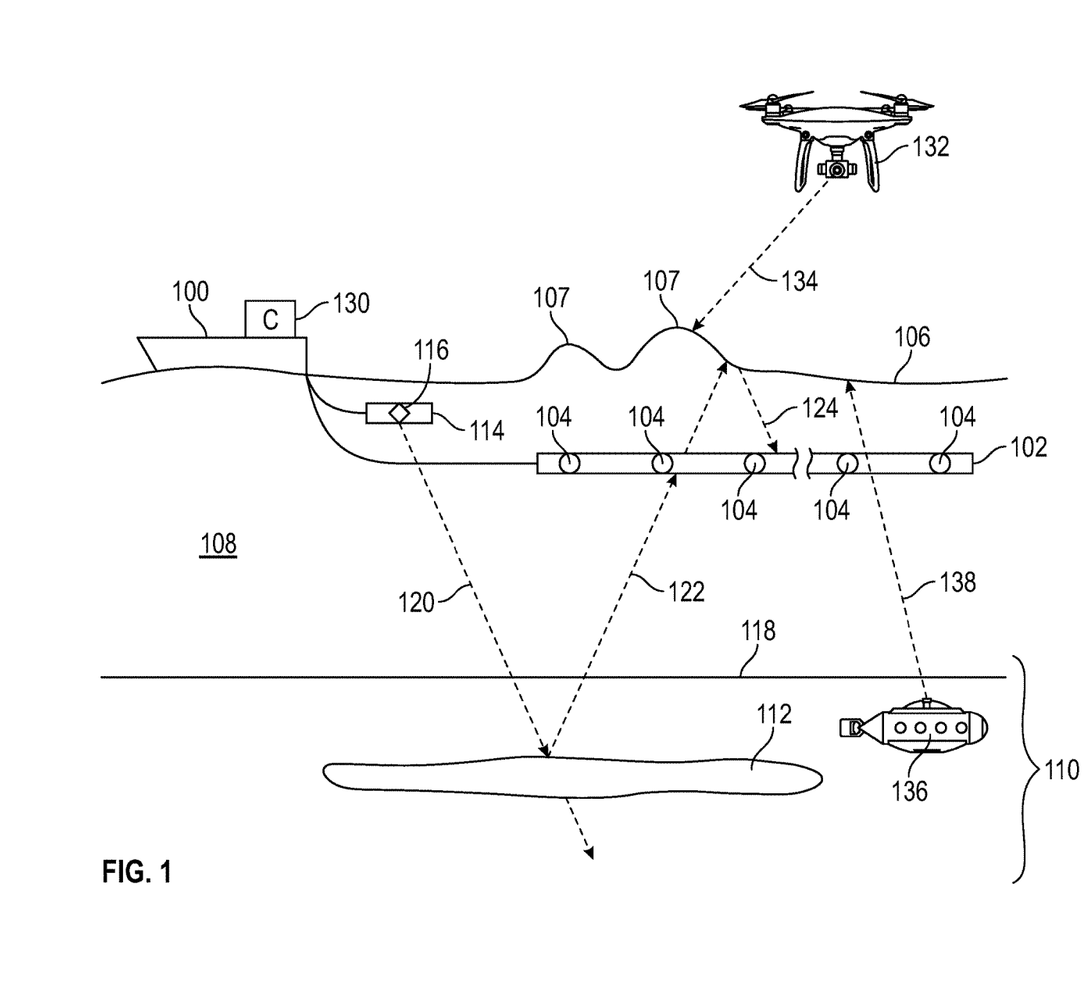
FIGS. 1 and 1A are schematic diagrams of a seismic survey vessel acquiring a marine seismic survey according to various embodiments of the techniques disclosed herein.

FIG. 1 illustrates an example marine survey arrangement that includes a marine vessel 100 for towing a streamer 102 that includes seismic receivers 104. In addition, the marine vessel 100 (or a different marine vessel) can tow a seismic source assembly 114, which has at least one seismic source 116.

The marine vessel 100 tows the streamer 102 and seismic source assembly 114 through a body of water 108 above a bottom surface 118 (e.g., seafloor). A subsurface structure 110 is located below the bottom surface 118, and the subsurface structure 110 includes at least one subsurface element 112 of interest. Examples of the subsurface element 112 can include a hydrocarbon-bearing reservoir, a freshwater aquifer, a gas injection zone or other subsurface element of interest.

FIG. 1 further depicts an arrow 120 that represents a seismic wavefield generated by the seismic source 116 and traveling generally downwardly into the subsurface structure 110. A portion of the seismic wavefield 120 is reflected from the subsurface structure 110, and travels generally upwardly (as indicated by arrow 122) toward the streamer 102. The upgoing seismic wavefield (122) is detected by the seismic receivers 104 of the streamer 102.

The upgoing seismic wavefield (122) continues to travel upwardly until the wavefield reaches the air-water interface/mean sea level (106), where the seismic wavefield is reflected generally downwardly (as indicated by arrow 124). The reflected downgoing seismic wavefield (124) is also detected at the seismic receivers 104, which causes ghost data to appear in the measurement data collected by the seismic receivers 104. The reflected downgoing wavefield interacts with the upgoing wavefield, which causes constructive and destructive interference that results in the ghost data. This interference is detrimental to the seismic data since it causes amplitude and phase distortions and can result in total elimination of frequencies near the so-called ghost notch frequency.

For simplicity, FIG. 1 depicts an example that includes just one instance of a source downgoing wavefield 120, a reflected upgoing wavefield 122 and a reflected downgoing wavefield 124. In an actual survey environment, there can be many instances of the various downgoing and upgoing wavefields. Also, in other examples, the survey arrangement can include more than one seismic source 116, in which case there can be additional instances of the various wavefields.

Generally, an upgoing wavefield refers to a wavefield that travels in a direction that has at least one directional component that is in the vertical up direction. Similarly, a downgoing wavefield refers to a wavefield that travels in a direction that has at least one directional component that is in the vertical down direction.

Figure 1A:
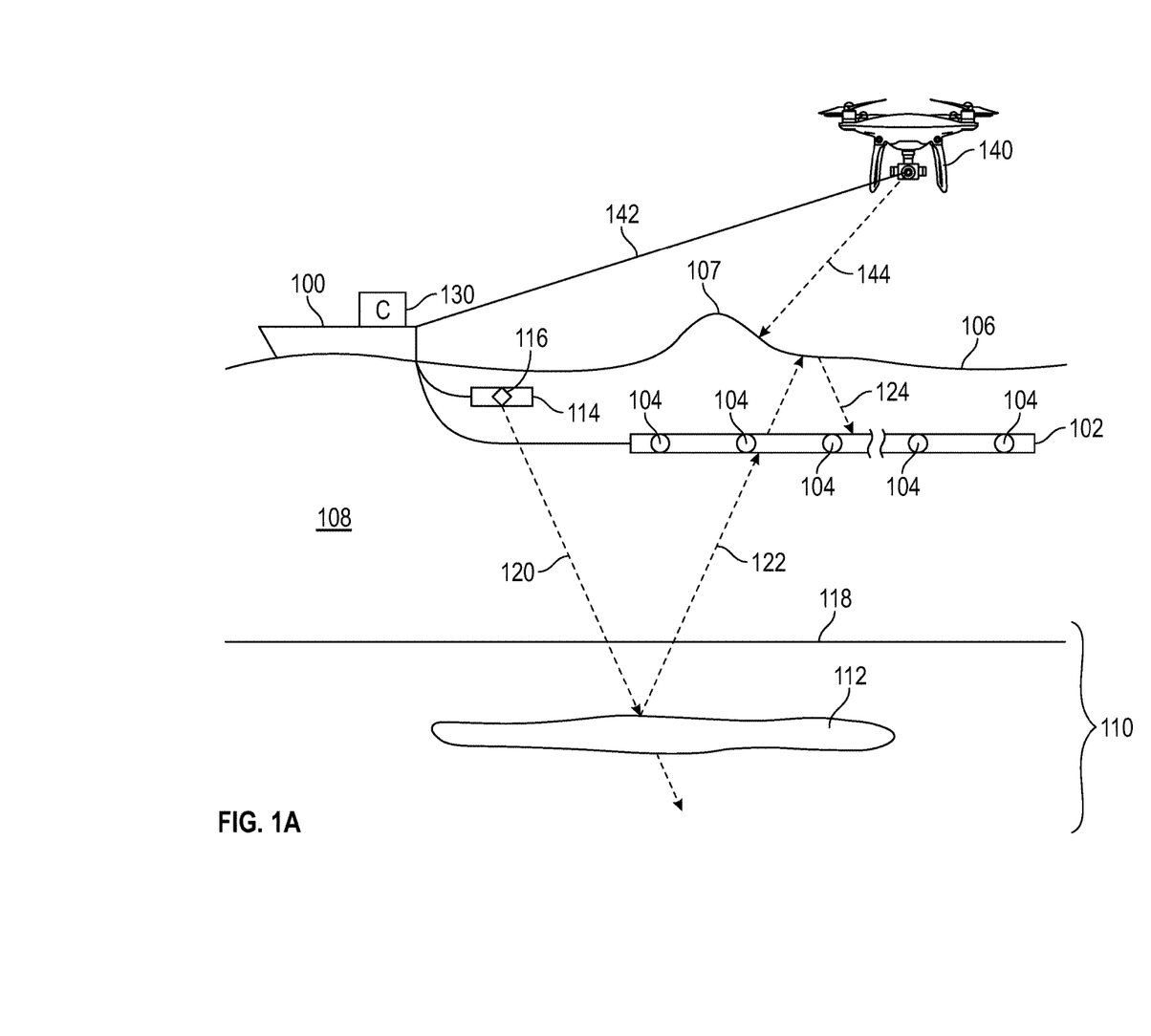

FIG. 1 further depicts a control system 130 deployed at the marine vessel 100. The control system 130 can be used to control activation of the seismic source assembly 114. The control system 130 can also receive measurement data collected by the seismic receivers 104. In some examples, the control system 130 is able to process the collected measurement data, such as to develop an image or other representation of the subsurface structure 110. In other examples, the collected measurement data from the seismic receivers 104 can be communicated to a remote system for further processing. FIG. 1 further illustrates an unmanned aerial vehicle (UAV) 132 that may be equipped with a radar system or a lidar system and is remote controlled by an operator on the vessel 100 or may fly autonomously based on a pre-determined flight plan to record measurements of a topography of the sea including the wave height 107 in space and time $Z(x, y;t)$ by emitting pulses of high-frequency electromagnetic waves 134 in the direction of the sea surface below. Portions of the pulses are reflected back to the radar/lidar system off the surface of the sea. In an alternative embodiment, an underwater vehicle 136 that is equipped with a sonar system may be used to acquire the wave height measurements instead of or in conjunction with UAV 132. The sonar system emits sound pulses 138 toward the surface of the sea. Portions of the sound pulses 138 are reflected back and recorded by the sonar system. The recorded reflections may be used to determine the topography of the sea surface including the height of waves 107 as will be apparent to those of skill in the art. In yet another embodiment, the wave height may be measured by a land based radar system or by a measurement system disposed in a balloon or kite 140 as depicted in FIG. 1A and tethered to the vessel 100 by a cable 142 that may include a power source and/or a steering mechanism to control the location of the balloon or kite 140. Those of skill in the art will understand that any of the aforementioned recordation systems or a combination thereof may be used to practice the method disclosed herein.

In one embodiment, the wave height is recorded by emitting pulses of electromagnetic waves 134 or other detectable types of emission to the surface of the sea. A portion of the electromagnetic waves is reflected back and detected by the measurement system and the recorded wave height and other topographical information about the sea surface is stored on a non-transitory memory device (not shown) on the UAV 132. In other embodiments, the recorded data is transmitted to a recordation device aboard the vessel 100. In other embodiments, the recorded wave heights may be transmitted via satellite link to a storage device on another vessel or to a different location on land to be retrieved at later.

The measurement data from the seismic receivers 104 may be combined with the recorded wave heights while processing the seismic data. The processing performed by the control system 130 or by another system may further include deghosting according to some implementations for deghosting measurement data received by the seismic receivers 104. Deghosting measured survey data refers to removing or mitigating an effect of reflection from the air-water interface 106 (or other type of interface) as will be discussed in further detail below.

Figure 2:
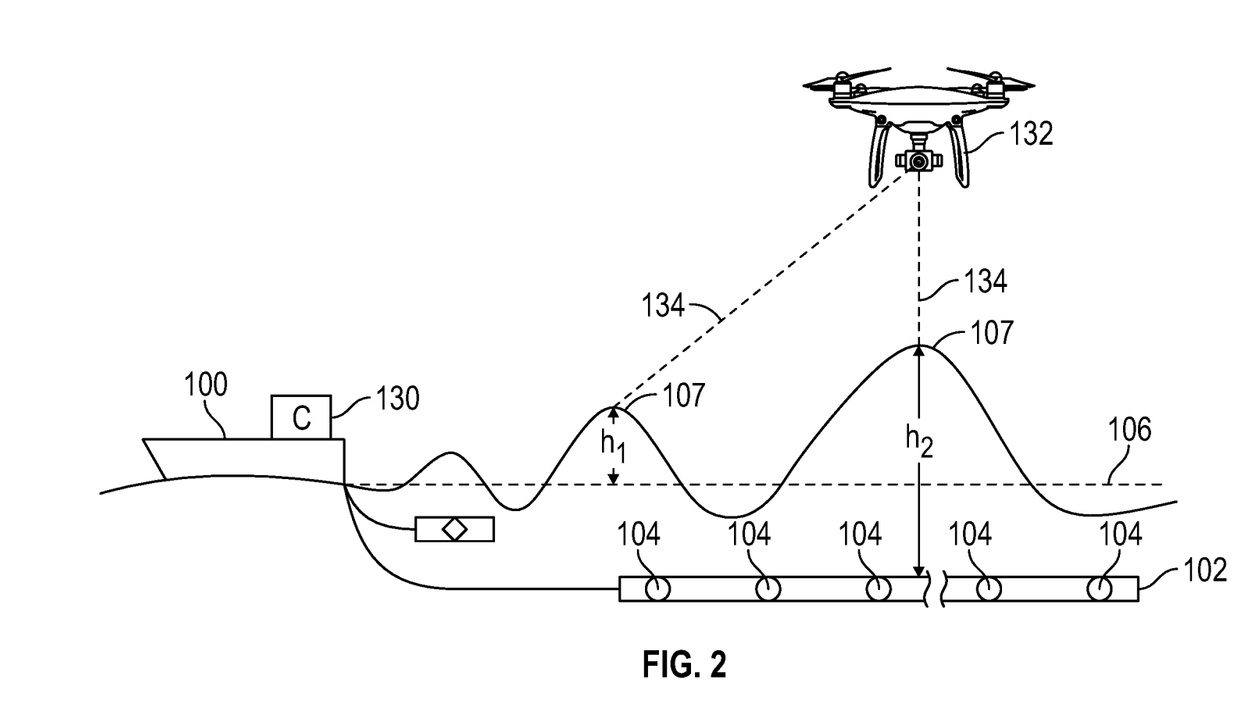
FIG. 2 is an enlarged view of a portion the seismic streamer and the sea surface in accordance with an embodiment of the techniques disclosed herein in a rough sea environment.
Figure 3:
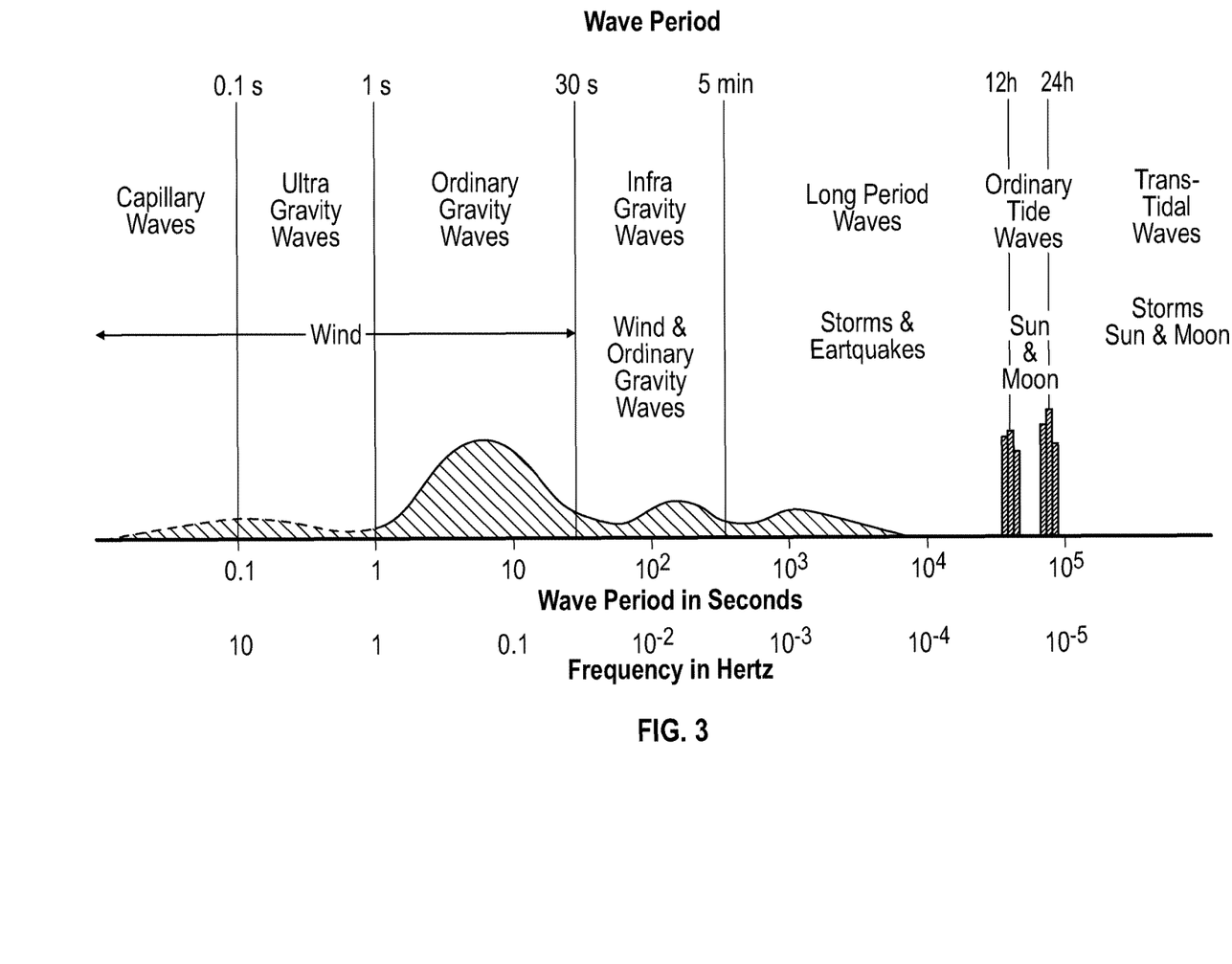
FIG. 3 illustrates different sea wave types that may be measured in accordance with embodiments of the techniques disclosed herein.

FIG. 2 illustrates an enlarged portion of the streamer 102 and the sea waves 107 from FIG. 1. The mean sea level 106 indicates the ideal sea level that would exist if the seas above the survey area were relatively calm. Wave heights $h_1$ and $h_2$ represent the approximate height between the crest of waves and the mean sea level 106 and the streamer 102, respectively. It is understood that the streamer 102 will undulate with sea currents to a certain degree. Wave heights $h_1$ and $h_2$ may be measured by any number of devices during the acquisition of seismic data. As shown in FIG. 2, in one embodiment, the wave heights $h_1$ and $h_2$ may be measured by a UAV 132. The UAV 132 may be equipped with a synthetic aperture radar (SAR) system. One SAR system that may be used as described in this disclosure is the small, high-performance SAR system manufactured by IMSAR LLC of Springville Utah. In other embodiments, the measurements may be carried out by an underwater vehicle or a land based system as discussed in connection with FIGS. 1-1A. This disclosure does not necessarily contemplate measuring every single wave that rises above the mean sea level 106. Rather, the "ocean rollers" or "gravity waves" as shown in FIG. 3 are the waves of interest. The more chaotic, short wavelength, and low amplitude wavelets that are also known as "capillary waves" may be neglected without departing from the teaching of this disclosure. The wave height measurements are recorded during a seismic survey. It therefore follows that there may be some coordination between the firing of seismic shots and the recordation of wave heights by the UAV or selected wave height recording system.

Further, while it is desirable to use the measured wave heights to characterize the sea surface based on measurements recorded at a sampling rate of every 1 millisecond or ½ milliseconds, it may be sufficient to measure less frequently and then interpolate measurements between selected sampling frequencies to derive the required samples. Accordingly, wave heights may be measured at a first frequency that is different that a second frequency at which the seismic data is recorded.

Those of ordinary skill in the art will be familiar with several approaches that may be used to interpolate measurements between the selected frequencies. Gravity waves are generally governed by deterministic physical laws. Therefore, interpolation of measurements between samples is a matter of solving differential equations in time given known boundary conditions (i.e., sampling rate). In an alternative embodiment, a matching pursuit algorithm may be used with additional constraints derived from known statistical characterizations such as the Pierson-Moskowitz spectrum, or spectra derived from sea surface snapshots.

Figure 4:
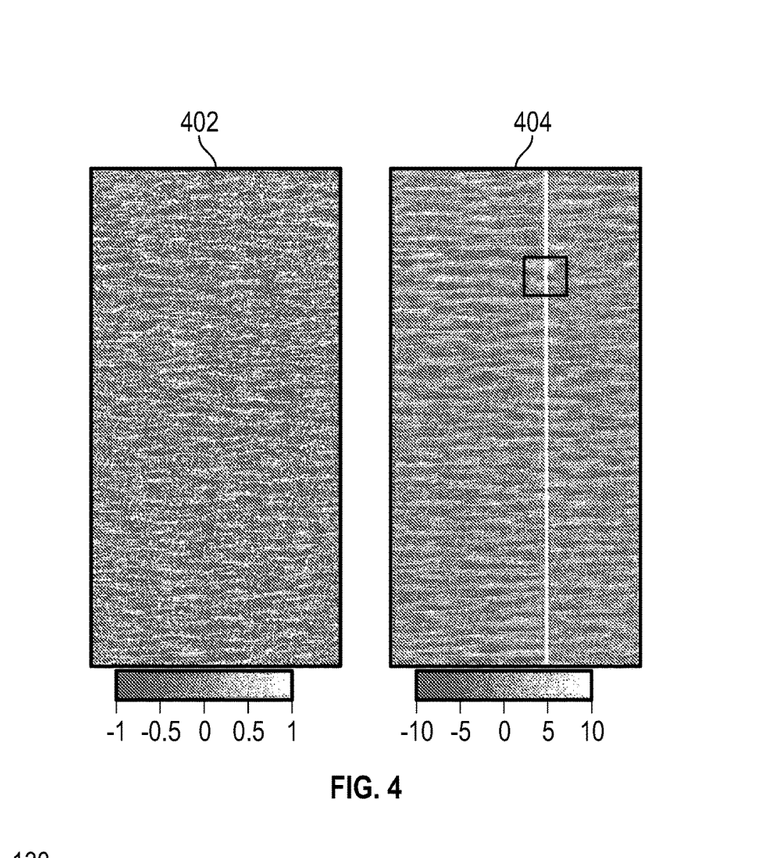
FIG. 4 depicts a synthetic aperture radar image of a sea surface and a corresponding wave elevation map that can be derived in accordance with embodiments of the techniques disclosed herein.

The foregoing are non-limiting examples of how the wave height may be measured. Those of skill in the art will be able to identify several other devices or systems that may be used to measure wave heights. Contemporary SAR systems that may be deployed to obtain wave heights are capable of producing resolutions of between 2-25 m. However, it is understood that the conversion from scattering intensity to sea-wave height is a not a trivial challenge to resolve. Algorithms such as the LISE inversion scheme may be used to derive elevation maps from SAR images as disclosed by The SAR Measurement of Ocean Waves: Wave Session Whitepaper, S. Lehner & F. J. Ocampo-Torres. For example, FIG. 4 illustrates a SAR image 402 and a corresponding sea surface elevation map 404. Certain surface deployed SAR systems may also be used to record measurements of wave heights without departing from the spirit of this disclosure.

Once the wave heights are recorded over the duration of a seismic survey, the wave heights can be used to characterize the shape or topography of the sea surface during the survey. The knowledge of the topography of the sea surface can then be used to characterize ghost data data resulting from reflections from an air-water interface of the marine environment. A deghosting algorithm can then be applied to the data to reduce or mitigate the effect of ghost data on the seismic data so that images or models derived from the seismic data can be more accurate and help inform better decision making as to the probable sources of hydrocarbons.

Deghosting of seismic data may be performed by using a deghosting algorithm. In one embodiment, the wave equation deghosting (WEDGE) method disclosed in commonly owned U.S. Pat. No. 9,354,341 to Crag Beaseley et al., which is hereby incorporated in its entirety may be employed to deghost seismic data. The accuracy of the WEDGE method is dependent on the knowledge of the sea surface or topography to an extent. Therefore, the knowledge of the sea surface or topography disclosed herein can be utilized to derive valuable insight into the subsurface. The WEDGE method incorporates the amplitude, phase and spectral variations created in the presence of rough seas, and successfully removes receiver ghosts.

In other embodiments, the deghosting operation may be performed by taking into account other parameters that may be independently derived from the seismic data. Those of skill in the art will understand that such parameters include but are not limited to depth of receiver, water velocity, surface reflection coefficient, and so forth.

Figure 5:
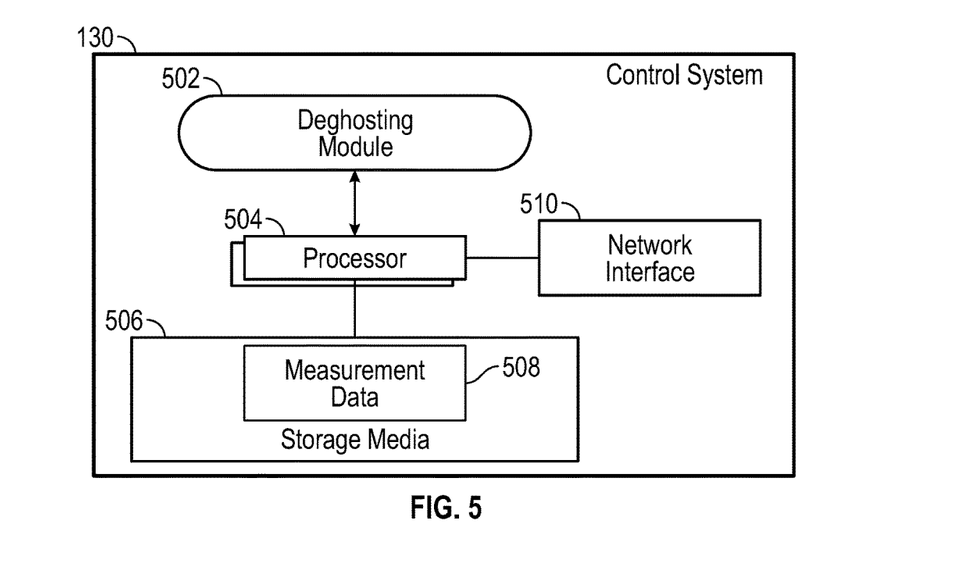
FIG. 5 is a block diagram of a control system according to some implementations of the present disclosure.

FIG. 5 illustrates an example control system 130 according to some implementations. The control system 130 includes a deghosting module 502, which can be implemented as machine-readable instructions executable on one or multiple processors 504. The control system 130 can be implemented with a computer system, or with a distributed arrangement of computer systems. A processor can include a microprocessor, microcontroller system, processor module or subsystem, programmable integrated circuit, programmable gate array, or another control or computing device.

The processor(s) 504 is (are) connected to a storage medium (or storage media) 506, which can store measurement data 508 collected by the survey receivers 104 depicted in FIG. 1. The control system 130 also includes a network interface 510 to allow the control system 130 to communicate with another system, such as with the streamer 102 to collect the measurement data, or with another system that communicates the measurement data to the control system 130.

The storage medium (or storage media) 506 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
  acquiring seismic data by conducting a survey of a subsurface area of interest wherein the seismic data includes ghost data;
  estimating a time-varying wave height above the subsurface area of interest during at least a portion of the survey, wherein the estimation of the wave height is based at least in part on a remote measurement of the wave height during the survey, wherein the wave height is measured using an underwater vehicle equipped with a synthetic aperture radar (SAR) system;
  using the estimated time-varying wave height to characterize the ghost data; and
  deghosting the seismic data based at least in part on the characterized ghost data.

2. The method of claim 1, wherein a radar system is used to measure the wave height.

3. The method of claim 1, wherein a lidar system is used to measure the wave height.

4. The method of claim 1, wherein the wave height is measured using a sonar system.

5. The method of claim 1, wherein the wave height is measured relative to a mean sea level.

6. The method of claim 1, wherein the wave height is measured at a first frequency that is different that a second frequency at which the seismic data is recorded.

7. The method of claim 6, wherein the first frequency is higher than the second frequency.

8. The method of claim 6, wherein additional values for wave height are derived by interpolation.

9. The method of claim 1, wherein the deghosting is performed using a wave equation deghosting algorithm.

10. A method comprising:
  acquiring seismic data by conducting a survey of a subsurface area of interest wherein the seismic data includes ghost data;
  remotely measuring a wave height above at least a portion of the subsurface area of interest during a portion of the survey, and wherein remotely measuring is coordinated with a firing of one or more seismic shots;
  using the measured wave height to characterize the ghost data; and
  deghosting the acquired seismic data based at least in part on the characterized ghost data.

11. The method of claim 10, wherein the wave height is measured from an elevated position relative to a sea level.

12. The method of claim 10, wherein the wave height is measured at a first frequency that is different that a second frequency at which the seismic data is recorded.

13. The method of claim 10, wherein the deghosting is performed using a wave equation deghosting algorithm.

14. The method of claim 10, wherein a radar system is used to measure the wave height.

15. The method of claim 10, wherein a lidar system is used to measure the wave height.

16. A system, comprising:
  a processor;
  a non-transitory memory comprising program instructions executable by the processor to:
    acquire seismic data by conducting a survey of a subsurface area of interest wherein the seismic data includes ghost data;
    remotely estimate a wave height above the subsurface area of interest at pre-determined time intervals during the survey, wherein the estimation of the wave height is based at least in part on a remote measurement of the wave height, and wherein remotely estimating is coordinated with a firing of one or more seismic shots;
    characterize the ghost data based at least in part on the estimated wave height; and
    deghost the acquired survey data based at least in part on the characterized ghost data.

17. The system of claim 16, further including a radar system for measuring the wave height.

18. The system of claim 16, wherein the deghosting is performed using a wave equation deghosting algorithm.

19. A method comprising:
acquiring seismic data by conducting a survey of a subsurface area of interest wherein the seismic data includes ghost data;
remotely measuring wave height while acquiring the seismic data, wherein remotely measuring is coordinated with a firing of one or more seismic shots; and
deghosting the seismic data based at least in part on the measured wave height.

\* \* \* \* \*